(12) United States Patent
Mitsunobu et al.

(10) Patent No.: US 12,071,691 B2
(45) Date of Patent: Aug. 27, 2024

(54) PLATED STEEL SHEET FOR AUTOMOBILE STRUCTURAL MEMBERS

(71) Applicant: NIPPON STEEL CORPORATION, Tokyo (JP)

(72) Inventors: Takuya Mitsunobu, Tokyo (JP); Takehiro Takahashi, Tokyo (JP); Hiroshi Takebayashi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/250,774

(22) PCT Filed: Dec. 24, 2021

(86) PCT No.: PCT/JP2021/048191
§ 371 (c)(1),
(2) Date: Apr. 27, 2023

(87) PCT Pub. No.: WO2022/153840
PCT Pub. Date: Jul. 21, 2022

(65) Prior Publication Data
US 2023/0383392 A1 Nov. 30, 2023

(30) Foreign Application Priority Data
Jan. 14, 2021 (JP) .................. 2021-004012

(51) Int. Cl.
| | | |
|---|---|---|
| *C23C 2/06* | (2006.01) | |
| *B32B 15/01* | (2006.01) | |
| *C21D 1/74* | (2006.01) | |
| *C21D 6/00* | (2006.01) | |
| *C21D 8/02* | (2006.01) | |
| *C21D 9/46* | (2006.01) | |
| *C22C 18/04* | (2006.01) | |
| *C22C 38/02* | (2006.01) | |
| *C22C 38/04* | (2006.01) | |
| *C23C 2/40* | (2006.01) | |

(52) U.S. Cl.
CPC .............. *C23C 2/06* (2013.01); *B32B 15/013* (2013.01); *C21D 1/74* (2013.01); *C21D 6/005* (2013.01); *C21D 6/008* (2013.01); *C21D 8/0205* (2013.01); *C21D 8/0236* (2013.01); *C21D 8/0278* (2013.01); *C21D 9/46* (2013.01); *C22C 18/04* (2013.01); *C22C 38/02* (2013.01); *C22C 38/04* (2013.01); *C23C 2/40* (2013.01)

(58) Field of Classification Search
CPC ........ B32B 15/013; C23C 28/345; C21D 1/76
See application file for complete search history.

(56) References Cited

FOREIGN PATENT DOCUMENTS

| | | |
|---|---|---|
| EP | 3078759 A1 | 10/2016 |
| EP | 3260575 A1 | 12/2017 |
| JP | 2003013192 A | 1/2003 |
| JP | 2004338397 A | 12/2004 |
| JP | 2010-106293 A | 5/2010 |
| JP | 5253090 B2 | 7/2013 |

*Primary Examiner* — Adam Krupicka
(74) *Attorney, Agent, or Firm* — Renner, Otto, Boisselle & Sklar, LLP

(57) ABSTRACT

A plated steel sheet for automobile structural members has a steel sheet, a plating layer formed on at least a part of a surface of the steel sheet, and an oxide layer formed on at least a part of a surface of the plating layer, the plating layer has a predetermined chemical composition, and when measurement by XPS is performed at a position 5.0 nm below a surface of the oxide layer in a thickness direction, $I_{Mg}/I_{MgOx}$, which is the ratio of a maximum detected intensity of Mg to a maximum detected intensity of an oxide or hydroxide of Mg, is 0.00 or greater and 1.20 or less.

8 Claims, No Drawings

PLATED STEEL SHEET FOR AUTOMOBILE STRUCTURAL MEMBERS

TECHNICAL FIELD OF THE INVENTION

The present invention relates to a plated steel sheet for automobile structural members.

Priority is claimed on Japanese Patent Application No. 2021-004012, filed on Jan. 14, 2021, the content of which is incorporated herein by reference.

RELATED ART

In recent years, plated steel sheets have been used for automobile structural members from the viewpoint of rust prevention, and hot-dip galvanized steel sheets such as galvannealed steel sheets have been applied mainly in the Japanese domestic market. A galvannealed steel sheet is a plated steel sheet having improved weldability and post-coating corrosion resistance, obtained by performing hot-dip galvanizing on the steel sheet and by subsequently performing an alloying heat treatment, thereby diffusing Fe from the steel sheet (base steel sheet) into the plating layer. However, hot-dip galvanized steel sheets are required to have further improved corrosion resistance such as post-coating corrosion resistance and red rust resistance.

Examples of the method of improving the corrosion resistance of a hot-dip galvanized steel sheet include adding Al to a plating layer containing Zn. For example, in the field of building materials, hot-dip Al—Zn-based plated steel sheets have been widely put into practical use as a plated steel sheet having high corrosion resistance. The plating layer of the hot-dip Al—Zn-based plating includes a dendrite-shaped α-(Zn, Al) phase (Al primary phase portion: an α-(Zn, Al) phase crystallized as a primary phase in the Al—Zn binary phase diagram. The α-(Zn, Al) phase is not necessarily an Al-rich phase, but crystallized as a solid solution of Zn and Al.) crystallized initially from a molten state, and a structure (Zn/Al mixed phase structure) formed of a Zn phase and an Al phase formed in the gaps of the dendrite-shaped Al primary phase portion. Since the Al primary phase portion is passivated and the Zn/Al mixed phase structure has a higher Zn concentration than the Al primary phase portion, the corrosion is concentrated in the Zn/Al mixed phase structure. As a result, the corrosion progresses in a moth-eaten manner in the Zn/Al mixed phase structure, and the corrosion progress path becomes complicated. Therefore, it becomes difficult for the corrosion to easily reach the base steel sheet. Accordingly, the hot-dip Al—Zn-based plated steel sheet has more excellent corrosion resistance than a hot-dip galvanized steel sheet having a plating layer of the same thickness. In addition, for the purpose of improving corrosion resistance, a Zn—Al—Mg-based plated steel sheet obtained by adding an element such as Mg to Al—Zn-based plating has also been considered.

Meanwhile, plated steel sheets to be applied to automobile structural members are required to have workability. In particular, since press forming is performed without coating, the lubricity between the die and punch and the plated steel sheet is important. Therefore, steel sheets to be applied to automobile structural members, which will be press-formed, are required to have excellent lubricity.

Regarding such a problem, Patent Document 1 discloses a lubricated and plated steel sheet having excellent workability in which on a surface of a steel sheet, an An alloy plating layer containing Al: 4 to 22 mass %. Mg: 1 to 5 mass %, Ti: 0.1 mass % or less, Si: 0.5 mass % or less, and a remainder consisting of Zn and unavoidable impurities is formed, a chromate membrane, a phosphate coating, or a base treating layer consisting of a resin-based membrane containing an aqueous resin is formed thereon, and a membrane with an adhesion amount of 0.2 to 5 $g/m^2$ obtained by applying and drying an aqueous lubricating paint containing 5 to 50 mass % of silica particles (b) and 1 to 40 mass % of a solid lubricant (c) with respect to 100 mass % of the solid content of the aqueous resin (a) is formed thereon.

In addition, Patent Document 2 discloses a hot-dip galvanized steel sheet having excellent formability and having a galvanized layer containing Al: 0.05 to 10 mass %, Mg: 0.01 to 5 mass % as necessary, and a remainder consisting of Zn and unavoidable impurities, in which a surface of the galvanized steel sheet has a centerline average roughness Ra of 0.5 to 1.5 µm, PPI (the number of peaks of 1.27 µm or higher included in 1 inch (2.54 cm)) of 150 to 300, and Pc (the number of peaks of 0.5 µm or higher included in 1 cm) of PPI/2.54+10 or greater. Patent Document 2 shows that the sliding ability is improved by satisfying Pc≥PPI/2.54+10.

PRIOR ART DOCUMENT

Patent Document

[Patent Document 1] Japanese Unexamined Patent Application, First Publication No. 2004-338397
[Patent Document 2] Japanese Unexamined Patent Application, First Publication No. 2003-13192

DISCLOSURE OF THE INVENTION

Problems to be Solved by the Invention

However, Patent Document 1 has a problem that the manufacturing cost is high since it is required to apply and dry the aqueous lubricating paint as a post-treatment after the plating step. In addition, Patent Document 2 has a problem that sufficient sliding ability cannot be obtained only by improving the roughness.

The present invention has been contrived in view of the above problems. An object of the present invention is to provide a plated steel sheet for automobile structural members having excellent lubricity, that is a Zn—Al—Mg-based plated steel sheet (a steel sheet including a plating containing Zn, Al, and Mg) having excellent corrosion resistance.

Means for Solving the Problem

The present inventors have studied a method of improving the lubricity in a Zn—Al—Mg-based plated steel sheet. As a result, it has been found that the lubricity of the plating layer is increased by increasing the proportion of Mg which is contained in the plating layer and exists as an oxide [MgO] or hydroxide [$Mg(OH)_2$].

In addition, it has been found that the chemical convertibility can be increased by reducing the proportion of Al contained in the plating layer and existing as an oxide [$Al_2O_3$] or hydroxide [$Al(OH)_3$].

The present invention has been contrived based on the above findings. The gist of the present invention is as follows.

[1] A plated steel sheet for automobile structural members having a steel sheet, a plating layer formed on at least a part of a surface of the steel sheet, and an oxide layer formed on at least a part of a surface of the plating layer, in which the plating layer contains, as a chemical composition, by mass %. Al: 0.5% to 35.0%, Mg: 0.5% to 15.0%. Si: 0% to 2.0%, Ca: 0% to 2.0%, Fe: 0% to 2.0%, La+Ce: 0% to 0.5% in total, Sb: 0% to 0.5%, Pb: 0% to 0.5%, Sr: 0% to 0.5%, Sn: 0% to 1.0%. Cu: 0% to 1.0%, Ti: 0% to 1.0%, Ni: 0% to 1.0%, Mn: 0% to 1.0%, Cr: 0% to 1.0%. Nb: 0% to 1.0%, Zr: 0% to 1.0%. Mo: 0% to 1.0%, U: 0% to 1.0%. Ag: 0% to 1.0%, B: 0% to 0.5%, Y: 0% to 0.5%, P: 0% to 0.5%, and a remainder of Zn and impurities, and when measurement by XPS is performed at a position 5.0 nm below a surface of the oxide layer in a thickness direction, $I_{Mg}/I_{MgOx}$, which is the ratio of a maximum detected intensity of Mg to a maximum detected intensity of an oxide or hydroxide of Mg, is 0.00 or greater and 1.20 or less.

[2] The plated steel sheet for automobile structural members according to [1], in which the chemical composition of the plating layer may contain, by mass %, Al: 6.0% to 30.0% and Mg: 3.0% to 11.0%.

[3] The plated steel sheet for automobile structural members according to [1] or [2], in which when measurement by XPS is performed at a position 5.0 nm below the surface of the oxide layer in the thickness direction, $I_{Al}/I_{AlOx}$, which is the ratio of a maximum detected intensity of Al to a maximum detected intensity of an oxide or hydroxide of Al, may be 0.77 or greater.

[4] The plated steel sheet for automobile structural members according to any one of [1] to [3], in which the $I_{Mg}/I_{MgOx}$ may be 0.00 or greater and 0.80 or less.

Effects of the Invention

According to the aspect of the present invention, it is possible to provide a plated steel sheet for automobile structural members having excellent lubricity, that is a steel sheet having a plating containing Zn, Al, and Mg (Zn—Al—Mg-based plated steel sheet). In addition, according to a preferable embodiment of the present invention, it is possible to provide a plated steel sheet for automobile structural members that is excellent in chemical convertibility in addition to lubricity.

EMBODIMENTS OF THE INVENTION

A plated steel sheet for automobile structural members according to an embodiment of the present invention (plated steel sheet according to the present embodiment) has a steel sheet, a plating layer formed on at least a part of a surface of the steel sheet, and an oxide layer formed on at least a part of a surface of the plating layer. In addition, in the plated steel sheet according to the present embodiment, the plating layer contains, as a chemical composition, by mass %, Al: 0.5% to 35.0% (preferably 6.0% to 30.0%), Mg: 0.5% to 15.0% (preferably 3.0% to 11.0%), Si: 0% to 2.0%. Ca: 0% to 2.0%, Fe: 0% to 2.0%. La+Ce: 0% to 0.5% in total, Sb: 0% to 0.5%. Pb: 0% to 0.5%. Sr: 0% to 0.5%, Sn: 0% to 1.0%, Cu: 0% to 1.0%. Ti: 0% to 1.0%, Ni: 0% to 1.0%, Mn: 0% to 1.0%, Cr: 0% to 1.0%, Nb: 0% to 1.0%, Zr: 0% to 1.0%, Mo: 0% to 1.0%, Li: 0% to 1.0%. Ag: 0% to 1.0%, B: 0% to 0.5%. Y: 0% to 0.5%, P: 0% to 0.5%, and a remainder of Zn and impurities.

In addition, in the plated steel sheet according to the present embodiment, when measurement by XPS is performed on a surface layer area (for example, a position 5.0 nm below a surface in the thickness direction) of the oxide layer, $I_{Mg}/I_{MgOx}$, which is the ratio of a maximum detected intensity of Mg to a maximum detected intensity of the oxide or hydroxide of Mg, is 0.00 or greater and 1.20 or less (preferably 0.00 or greater and 0.80 or less).

In addition, in the plated steel sheet according to the present embodiment, when measurement by XPS is performed at a position 5.0 nm below the surface of the oxide layer in the thickness direction. $I_{Al}/I_{AlOx}$, which is the ratio of a maximum detected intensity ($I_{Al}$) of Al to a maximum detected intensity ($I_{AlOx}$) of the oxide or hydroxide of Al, is preferably 0.77 or greater.

<Steel Sheet>

The plating layer and the oxide layer are important for the plated steel sheet according to the present embodiment. Therefore, the kind of the steel sheet (base steel sheet) is not particularly limited, and may be determined according to the product to which the steel sheet is applied, the required strength, the sheet thickness, and the like. For example, a hot-rolled steel sheet described in JIS G3193: 2008 or a cold-rolled steel sheet described in JIS G3141: 2017 can be used.

<Plating Layer>

The plated steel sheet according to the present embodiment includes a plating layer on at least a part of the surface of the steel sheet. The plating layer may be formed on one surface or both surfaces of the steel sheet.

The adhesion amount of the plating layer is preferably 15 to 250 g/m² per surface.

[Chemical Composition]

The chemical composition of the plating layer of the plated steel sheet according to the present embodiment will be described. Hereinafter, % regarding the chemical composition represents mass %.

Al: 0.5% to 35.0%

Al is an element effective for ensuring post-coating corrosion resistance in a plating layer containing aluminum (Al), zinc (Zn), and magnesium (Mg). In order to sufficiently obtain the above effect, the Al content is adjusted to 0.5% or greater. The Al content is preferably 1.0% or greater, and more preferably 6.0% or greater.

Meanwhile, in a case where the Al content is greater than 35.0%, the post-coating corrosion resistance and the corrosion resistance of a cut end surface of the plating layer are reduced. In addition, the amount of Al oxide formed is increased, and the formation of MgO and Mg(OH)$_2$ in the oxide layer is inhibited. Therefore, the Al content is 35.0% or less. The Al content is preferably 30.0% or less.

Mg: 0.5% to 15.0%

Mg is an element having an effect of increasing the corrosion resistance of the plating layer. In order to sufficiently obtain the above effect, the Mg content is adjusted to 0.5% or greater. The Mg content is preferably 1.0% or greater, and more preferably 3.0% or greater.

Meanwhile, in a case where the Mg content is greater than 15.0%, the post-coating corrosion resistance is reduced, and the workability of the plating layer is reduced. In addition, an Mg-based compound is formed inside the plating layer instead of near the surface, the formation of MgO and Mg(OH)$_2$ (oxide and hydroxide) near the surface is inhibited. In addition, manufacturing problems occur such as an increase in the amount of dross generated in the plating bath. Therefore, the Mg content is 15.0% or less. The Mg content is preferably 11.0% or less.

Si: 0% to 2.0%

Si is an element that contributes to an improvement of the post-coating corrosion resistance of the plating layer by forming a compound together with Mg. In addition, Si is an element having an effect of suppressing the formation of an excessively thick alloy layer between the steel sheet and the plating layer in the formation of the plating layer on the steel sheet, thereby increasing the adhesion between the steel sheet and the plating layer. Therefore, Si may be contained. Si is not necessarily required to be contained, and the lower limit of the Si content is 0%. However, in order to obtain the above effect, the Si content is preferably adjusted to 0.1% or greater.

Meanwhile, in a case where the Si content is greater than 2.0%, excessive Si is crystallized in the plating layer or a lamellar structure is not sufficiently formed, whereby the post-coating corrosion resistance is reduced. In addition, the workability of the plating layer is reduced. Therefore, the Si content is 2.0% or less. The Si content is more preferably 1.5% or less.

Ca: 0% to 2.0%

In a case where Ca is contained in the plating layer, the amount of dross that is likely to be formed with an increase of the Mg content during the plating operation is reduced, and the plating manufacturability is improved. Therefore, Ca may be contained. Ca is not necessarily required to be contained, and the lower limit of the Ca content is 0%. However, in order to obtain the above effect, the Ca content is preferably adjusted to 0.1% or greater.

Meanwhile, in a case where the Ca content is excessive, the post-coating corrosion resistance is reduced. In addition, the post-coating corrosion resistance itself of a flat portion of the plating layer tends to deteriorate, and the corrosion resistance around a welded part may also deteriorate. Therefore, the Ca content is 2.0% or less. The Ca content is preferably 1.0% or less.

Fe: 0% to 2.0%

Fe is mixed in the plating layer as an impurity from the steel sheet or the like that is a plating substrate in the manufacturing of the plating layer. Fe may be contained in an amount of up to about 2.0%. However, in a case where the Fe content is within this range, the adverse effect on the characteristics of the plated steel sheet according to the present embodiment is small. Therefore, the Fe content is preferably 2.0% or less. The Fe content is more preferably 1.5% or less, and even more preferably 1.0% or less.

Meanwhile, as described above, Fe is mixed in the plating layer as an impurity. Since significant cost is required to completely prevent the mixing of Fe, the Fe content may be 0.1% or greater.

Basically, the chemical composition of the plating layer of the plated steel sheet according to the present embodiment has the above chemical composition and a remainder consisting of Zn and impurities.

However, the plating layer of the plated steel sheet according to the present embodiment may contain, instead of a part of Zn, for example, La, Ce, Sb, Pb, Cu, Sn, Ti, Sr, Ni, Mn, Cr, Nb, Zr, Mo, Li, Ag, B, Y, and P within the following ranges (it does not matter whether the above elements are intentionally added or contained as impurities). Since these elements are not necessarily contained, the lower limit of the content is 0%.

The total amount of the impurities is preferably 5.0% or less, and more preferably 3.0% or less.

La+Ce: 0% to 0.5% in Total

La and Ce are elements that contribute to an improvement of the corrosion resistance of the plating layer. Therefore, one or two of La and Ce may be contained. It is not required to contain La and/or Ce, and the lower limit of the amount of La and/or Ce is 0%. However, in order to obtain the above effect, the total amount of La and Ce is preferably adjusted to 0.01% or greater.

Meanwhile, in a case where the total amount of La and Ce is greater than 0.5%, the viscosity of the plating bath increases, and it is often difficult to prepare the plating bath itself. In this case, it is not possible to manufacture a plated steel sheet having good plating properties. Therefore, the total amount of La and Ce is 0.5% or less.

Sb: 0% to 0.5%
Sr: 0% to 0.5%
Pb: 0% to 0.5%

In a case where Sr, Sb, or Pb are contained in the plating layer, the external appearance of the plating layer changes, spangles are formed, and an improvement of metallic gloss is thus confirmed. Therefore, Sr, Sb, or Pb may be contained. However, in a case where the amount of these elements is greater than 0.5%, various intermetallic compound phases are formed, and the workability and the corrosion resistance deteriorate. In addition, in a case where the amount of these elements is excessive, the viscosity of the plating bath increases, and it is often difficult to prepare the plating bath itself. Accordingly, it is not possible to manufacture a plated steel sheet having good plating properties. Therefore, the Sr content is 0.5% or less, the Sb content is 0.5% or less, and the Pb content is 0.5% or less.

Sn: 0% to 1.0%

Sn is an element that increases the Mg elution rate in the plating layer containing Zn, Al, and Mg. In a case where the Mg elution rate increases, the corrosion resistance of the flat portion deteriorates. Therefore, the Sn content is 1.0% or less.

Cu: 0% to 1.0%
Ti: 0% to 1.0%
Ni: 0% to 1.0%
Mn: 0% to 1.0%
Cr: 0% to 1.0%
Nb: 0% to 1.0%
Zr: 0% to 1.0%
Mo: 0% to 1.0%
Li: 0% to 1.0%
Ag: 0% to 1.0%
B: 0% to 0.5%
Y: 0% to 0.5%
P: 0% to 0.5%

These elements contribute to an improvement of the corrosion resistance. Therefore, the above elements may be contained. Meanwhile, in a case where the amount of these elements is excessive, the viscosity of the plating bath increases, and it is often difficult to prepare the plating bath itself. Accordingly, it is not possible to manufacture a plated steel sheet having good plating properties. Therefore, the amount of each element is 1.0% or less.

The chemical composition of the plating layer is measured by the following method.

First, an acid liquid is obtained by exfoliating and dissolving the plating layer with an acid containing an inhibitor that suppresses the corrosion of a base metal (steel sheet). Next, by measuring the obtained acid liquid by ICP analysis, the chemical composition of the plating layer (In a case where an alloy layer is formed between the plating layer and the steel sheet, the chemical composition is a total chemical composition of the plating layer and the alloy layer. However, the influence thereof is small since the alloy layer is thin.). The acid kind is not particularly limited as long as the acid is capable of dissolving the plating layer. The chemical composition is measured as an average chemical composition.

[Structure]

In the plated steel sheet according to the present embodiment, the plating structure is not particularly limited. According to the chemical composition of the plating layer of the plated steel sheet according to the present embodiment, the plating structure includes, for example, (Al—Zn) dendrite, a lamellar structure of (Al—Zn) phase/$MgZn_2$ phase, a lamellar structure of Zn phase/$MgZn_2$ phase, a ternary eutectic structure of Zn/Al/$MgZn_2$, a $MgZn_2$ phase, a dendrite or amorphous Zn phase, a $Mg_2Si$ phase, and/or other intermetallic compound phases.

<Oxide Layer>

The plated steel sheet according to the present embodiment includes an oxide layer on at least a part of the surface of the plating layer. The oxide layer may be formed on one surface or both surfaces.

The present inventors have studied a method of improving the lubricity in a Zn—Al—Mg-based plated steel sheet. As a result, it has been found that the lubricity of the plating layer is increased by increasing the proportion of Mg contained in the plating layer and existing as an oxide or hydroxide. Specifically, it has been found that when the measurement by X-ray photoelectron spectroscopy (XPS) is performed at a position 5.0 nm below the surface of the oxide layer in the thickness direction, in a case where $I_{Mg}/I_{MgOx}$, which is the ratio of a maximum detected intensity ($I_{Mg}$) of Mg (metal state) to a maximum detected intensity ($I_{MgOx}$) of the oxide or hydroxide of Mg, is 0.00 or greater and 1.20 or less, the lubricity is improved.

The reason for this is not clear, but it is thought that in the surface layer area of the oxide layer coming into contact with a die and punch or the like, when $I_{Mg}/I_{MgOx}$ is low, that is, the existing ratio of MgO (Mg oxide) or $Mg(OH)_2$ (Mg hydroxide) is high, MgO or $Mg(OH)_2$ functions as a lubricating material, thereby improving the lubricity. In view of lubricity, the above effect is obtained with any of MgO and $Mg(OH)_2$. However, it is thought that MgO mainly acts in the plated steel sheet according to the present embodiment.

In the past, a relatively large amount of MgO or $Mg(OH)_2$ was formed in a surface (or a range significantly thinner than 5 nm from the surface) in some cases. However, as a result of the study by the present inventors, it has been found that it is important that the existing ratio of MgO (Mg oxide) or $Mg(OH)_2$ (Mg hydroxide) is high at a position 5.0 nm below the surface in the thickness direction (a position where the surface of the plating layer is ground by 5.0 nm in the depth direction, as will be described later).

Meanwhile, the chemical convertibility may be reduced in a case where $Al_2O_3$ (Al oxide) or $Al(OH)_3$ (Al hydroxide) is excessively formed in the oxide layer. In order to ensure excellent chemical convertibility, when measurement by XPS is performed at a position 5.0 nm below the surface in the thickness direction, $I_{Al}/I_{AlOx}$, which is the ratio of a maximum detected intensity ($I_{Al}$) of Al (metal state) to a maximum detected intensity ($I_{AlOx}$) of the oxide or hydroxide of Al, is preferably 0.77 or greater. There is no need to limit the upper limit, but it is thought that the upper limit of the ratio rarely exceeds 2.00.

$I_{Mg}/I_{MgOx}$ and $I_{Al}/I_{AlOx}$ at a position 5.0 nm below the surface of the oxide layer in the thickness direction are measured using XPS.

Specifically, the surface of the plating layer is ground by 5.0 nm (in a permissible range of 4.0 to 6.0 nm) in the depth direction by argon sputtering or the like, and the XPS measurement is performed at that position (a position at a depth of 5.0 nm (the depth may be in a range of 4.0 to 6.0 nm)). In the XPS measurement, for example, a Quantera SXM XPS analysis device manufactured by ULVAC-PHL INC., or a device equivalent thereto is used, and the following conditions are adopted.

X-ray source: mono-Al·Kα (1486.6 eV)
Degree of vacuum: $9 \times 10^{-10}$ torr
Ion species: $Ar^+$
Acceleration voltage: 4 kV
Rate: 22.7 nm/min ($SiO_2$)

As a result of the XPS measurement, the peak in an energy range of 304 to 309 eV is regarded as a peak obtained from the Mg oxide or Mg hydroxide, and the peak in an energy range of 300 to 303 eV is a peak obtained from the metal Mg. The maximum detected intensity of each peak is measured, and $I_{Mg}/I_{MgOx}$ is calculated.

Regarding $I_{Al}/I_{AlOx}$, the peak in an energy range of 73.5 to 76.5 eV is regarded as a peak obtained from the Al oxide or Al hydroxide, and the peak in an energy range of 72.0 to 73.4 eV is regarded as a peak obtained from the metal Al. $I_{Al}/I_{AlOx}$ is calculated from the maximum intensities of the peaks.

The thickness of the oxide layer is not particularly limited, but is, for example, greater than 5.0 nm and 50.0 nm or less.

The thickness of the oxide layer is measured by the following method. The XPS measurement is performed in the depth direction at a pitch of 1 to 3 am from the surface of the plated steel sheet, and the depth until the maximum strength of oxygen becomes ½₀ of the maximum strength of the outermost surface is defined as the thickness of the oxide layer.

<Manufacturing Method>

Next, a preferable manufacturing method of the plated steel sheet according to the present embodiment will be described. The plated steel sheet according to the present embodiment can obtain the effects as long as it has the above-described characteristics regardless of the manufacturing method. However, it is preferable to manufacture the plated steel sheet according to the following method since it is possible to stably manufacture the plated steel sheet.

Specifically, the steel sheet according to the present embodiment can be manufactured by a manufacturing method including the following steps (I) to (III).

(I) An annealing step of performing reduction annealing on a steel sheet (II) A plating step of immersing the steel sheet in a plating bath containing Al, Mg, and Zn to obtain a plated original sheet (III) A controlled cooling step of cooling the plated original sheet in a temperature range of bath temperature to 380° C. at an average cooling rate of 10.0° C./sec or less in an inert gas atmosphere having a dew point of −10° C. or higher, and cooling the plated original sheet in a temperature range of 380° C. to 100° C. at an average cooling rate of 15° C./sec or greater in an atmosphere having a dew point of −20° C. or lower Hereinafter, preferable conditions of each step will be described.

[Annealing Step]

In the annealing step, reduction annealing is performed on a steel sheet (hot-rolled steel sheet or cold-rolled steel sheet) obtained by a known method prior to the plating step. As the annealing conditions, known conditions may be adopted. For example, the steel sheet is heated to 750° C. to 900° C. in a 5% $H_2$—$N_2$ gas atmosphere having a dew point of −10° C. or higher and held for 30 to 240 seconds.

[Plating Step]

In the plating step, the steel sheet is immersed in a plating bath to obtain a plated original sheet. Preferably, the plating bath contains Al: 0.5% to 35.0%, Mg: 0.5% to 15.0%, Si: 0% to 2.0%, Ca: 0% to 2.0%, and a remainder of Zn and impurities. The plating bath may further contain La, Ce, Fe, Sb, Pb. Cu, Sn, Ti, Sr, Ni, Mn, Cr, Nb, Li, and Ag as necessary. Since the composition of the plating layer formed from the composition of the plating bath can be estimated, the composition of the plating bath may be adjusted according to the chemical composition of the plating layer to be obtained.

[Controlled Cooling Step]

In the controlled cooling step, the plated original sheet after the plating step (pulled up from the plating bath) is cooled after the plating adhesion amount is adjusted with a wiping gas such as $N_2$. In cooling, the steel sheet pulled up from the plating bath (having a temperature equivalent to the temperature of the plating bath) is cooled to 100° C. or lower. During the cooling, the average cooling rate from bath temperature to 380° C. is 10.0° C./sec or less. In addition, the atmosphere during the cooling from bath temperature to 380° C. is an inert gas atmosphere, and the dew point thereof is −10° C. or higher (first cooling). In addition, the average cooling rate from 380° C. to 100° C. is 15° C./sec or greater, and the dew point of the atmosphere is −20° C. or lower (second cooling).

In a case where the average cooling rate up to 380° C. is greater than 10.0° C./sec, oxidation does not sufficiently occur, and $I_{Mg}/I_{MgOx}$ increases in the oxide layer.

In addition, in a case where the dew point of the atmosphere is lower than −10° C., an oxide of Al is formed preferentially than MgO and $Mg(OH)_2$, and $I_{Mg}/I_{MgOx}$ increases in the oxide layer. Even in a case where an oxide of Al is formed, it does not contribute to the improvement of lubricity. In addition, in a case where the ratio of the maximum detected intensity of Al to the maximum detected intensity of the oxide or hydroxide of Al is increased to increase the chemical convertibility, the dew point of the atmosphere is preferably 0° C. or higher.

Regarding the atmosphere, the mechanism is not necessarily clear, but in the air, a predetermined oxide layer cannot be obtained even in a case where the dew point is −10° C. or higher. Therefore, the atmosphere is an inert gas atmosphere. The inert gas atmosphere is, for example, an $N_2$ atmosphere, an Ar atmosphere, or a He atmosphere. However, since the inert gas alone has a low dew point (lower than −20° C.), the dew point is controlled by introducing a $H_2O$ gas.

In a case where the average cooling rate from 380° C. to 100° C. is less than 15° C./sec, the oxidation excessively proceeds, and oxides such as ZnO grow. Accordingly, $I_{Mg}/I_{MgOx}$ is reduced in the oxide layer.

In addition, in a case where the dew point of the atmosphere during the cooling in this temperature range is higher than −20° C., the oxidation excessively proceeds, and oxides such as ZnO grow. Accordingly, $I_{Mg}/I_{MgOx}$ is reduced.

The cooling start temperature of the second cooling is preferably 380° C. (the cooling rate is preferably switched immediately after the completion of the first cooling). However, as long as the average cooling rate up to 100° C. is less than 15° C./sec, the start temperature of the second cooling may be in a range of 380° C. to 330° C.

According to the above-described manufacturing method, the plated steel sheet according to the present embodiment can be obtained.

EXAMPLES

Hereinafter, the present invention will be described in greater detail with examples, but is not limited to these examples.

A cold-rolled steel sheet (0.2% C-2.0% Si-2.3% Mn) having a sheet thickness of 1.6 mm was prepared as a steel sheet to be subjected to annealing and plating.

The steel sheet was cut into a size of 100 mm× 200 mm (×sheet thickness), and then continuously subjected to annealing and hot-dip plating using a batch type hot-dip plating test device.

In annealing, the annealing was performed at 860° C. for 120 seconds under an atmosphere consisting of a gas containing 5% of a $H_2$ gas and a remainder consisting of $N_2$ and having a dew point of 0° C. in a furnace having an oxygen concentration of 20 ppm or less.

After the annealing, the steel sheet was air-cooled with an $N_2$ gas, and when the steel sheet temperature reached a temperature of bath temperature+20° C., the steel sheet was immersed for about 3 seconds in a plating bath having a bath temperature shown in Table 1A.

The plated original sheet having a plating layer formed thereon was cooled to room temperature so that the average cooling rate from bath temperature to 380° C. the average cooling rate from 380° C. to 100° C., and the atmosphere (atmosphere gas and dew point) were as shown in the conditions shown in Table 1B. The temperature of the steel sheet was measured using a thermocouple spot-welded to a central portion of the plated original sheet.

The composition of the formed plating layer was as shown in Table 1A.

Regarding the obtained plated steel sheet, $I_{Mg}/I_{MgOx}$ and $I_{Al}/I_{AlOx}$ at a position 5 nm below the surface of the oxide layer in the thickness direction of the oxide layer were measured by the above-described method using XPS.

The results are shown in Table 2.

TABLE 1A

| | | Components of Plating Layer (mass %) (with a remainder consisting of Zn and impurities) | | | | | | | Temperature of Plating Bath (° C.) | Immersing Time in Plating Bath (s) |
|---|---|---|---|---|---|---|---|---|---|---|
| Classification | No. | Al | Mg | Si | Ca | Fe | Others | Kind | | |
| Comparative Example | 1 | 0.2 | 0.2 | 0.1 | 0.1 | 0.2 | (mass %) | Kind | 460 | 3 |
| Invention Example | 2 | 0.5 | 0.5 | 0.1 | 0.1 | 0.1 | 0.0050 | Cu | 460 | 3 |
| Invention Example | 3 | 1.0 | 1.0 | 0.0 | 0.0 | 0.2 | 0.0100 | Ni | 460 | 3 |
| Invention Example | 4 | 3.0 | 2.0 | 0.0 | 0.0 | 0.3 | 0.0010 | Zr | 460 | 3 |
| Invention Example | 5 | 6.0 | 3.0 | 0.0 | 0.0 | 0.3 | 0.0200 | Sr | 460 | 3 |
| Invention Example | 6 | 11.0 | 6.0 | 0.1 | 0.0 | 0.1 | 0.0004 | Li | 470 | 3 |
| Invention Example | 7 | 11.0 | 6.0 | 0.1 | 0.0 | 0.1 | 0.0001 | Ag | 470 | 3 |
| Invention Example | 8 | 11.0 | 6.0 | 0.1 | 0.0 | 0.1 | 0.0050 | Pb | 470 | 3 |

TABLE 1A-continued

| Classification | No. | Al | Mg | Si | Ca | Fe | Others | | Temperature of Plating Bath (° C.) | Immersing Time in Plating Bath (s) |
|---|---|---|---|---|---|---|---|---|---|---|
| Comparative Example | 9 | 19.0 | 0.0 | 0.1 | 0.1 | 0.1 | | | 480 | 3 |
| Invention Example | 10 | 20.0 | 7.0 | 0.1 | 0.2 | 0.1 | 0.0100 | Sb | 480 | 3 |
| Invention Example | 11 | 20.0 | 7.0 | 0.0 | 0.1 | 0.1 | 0.0020 | B | 480 | 3 |
| Invention Example | 12 | 20.0 | 7.0 | 0.1 | 0.1 | 0.1 | 0.0001 | Y | 480 | 3 |
| Invention Example | 13 | 20.0 | 7.0 | 0.1 | 0.2 | 0.1 | 0.0010 | P | 480 | 3 |
| Comparative Example | 14 | 20.0 | 8.0 | 0.1 | 0.1 | 0.1 | | | 500 | 3 |
| Comparative Example | 15 | 20.0 | 8.0 | 0.1 | 0.1 | 0.1 | | | 500 | 3 |
| Comparative Example | 16 | 20.0 | 8.0 | 0.1 | 0.1 | 0.1 | | | 500 | 3 |
| Comparative Example | 17 | 20.0 | 8.0 | 0.1 | 0.1 | 0.1 | | | 500 | 3 |
| Comparative Example | 18 | 20.0 | 8.0 | 0.1 | 0.2 | 0.1 | | | 500 | 3 |
| Invention Example | 19 | 20.0 | 8.0 | 0.1 | 0.1 | 0.1 | 0.1000 | Sn | 500 | 3 |
| Invention Example | 20 | 20.0 | 8.0 | 0.1 | 0.1 | 0.1 | 0.1000 | Cr | 500 | 3 |
| Invention Example | 21 | 20.0 | 8.0 | 0.2 | 0.1 | 0.1 | 0.0010 | Ti | 500 | 3 |
| Invention Example | 22 | 20.0 | 8.0 | 0.1 | 0.1 | 0.1 | 0 0010 | Nb | 500 | 3 |
| Comparative Example | 23 | 20.0 | 8.0 | 0.1 | 0.1 | 0.1 | | | 500 | 3 |
| Invention Example | 24 | 20.0 | 15.0 | 0.5 | 2.0 | 0.2 | 0.0001 | Mn | 580 | 3 |
| Comparative Example | 25 | 20.0 | 8.0 | 0.1 | 0.1 | 0.1 | | | 500 | 3 |
| Invention Example | 26 | 20.0 | 15.0 | 0.5 | 2.0 | 0.2 | 0.0010 | Mo | 580 | 3 |
| Invention Example | 27 | 25.0 | 8.5 | 2.0 | 0.1 | 0.1 | | | | 3 |
| Invention Example | 28 | 25.0 | 8.5 | 0.1 | 0.1 | 0.1 | 0.0001 | La | 480 | 7 |
| Invention Example | 29 | 30.0 | 9.5 | 0.1 | 0.1 | 0.1 | 0.0002 | Ce | 480 | 3 |
| Invention Example | 30 | 35.0 | 8.0 | 1.0 | 0.1 | 0.1 | 0.010 | La: 0.005, Ce: 0.005 | 490 | 3 |
| Comparative Example | 31 | 34.0 | 15.5 | 0.1 | 0.1 | 0.1 | | | 490 | 3 |
| Comparative Example | 32 | 40.0 | 2.0 | 0.1 | 0.1 | 0.1 | | | 550 | 3 |

TABLE 1B

| | Cooling 1 Bath Temperature to 380° C. | | | Cooling 2 380° C. to 100° C. | | Adhesion Amount of Plating |
|---|---|---|---|---|---|---|
| No. | Dew Point (° C.) | Atmosphere Gas | Average Cooling Rate (° C./s) | Dew Point (° C.) | Average Cooling Rate (° C./s) | Layer g/m² |
| 1 | 0 | N₂ | 10.0 | −40 | 30 | 30 |
| 2 | 0 | N₂ | 10.0 | −40 | 30 | 30 |
| 3 | 0 | N₂ | 10.0 | −40 | 30 | 30 |
| 4 | 0 | N₂ | 10.0 | −40 | 30 | 30 |
| 5 | 0 | N₂ | 5.0 | −40 | 30 | 30 |
| 6 | 0 | Ar | 5.0 | −40 | 30 | 40 |
| 7 | 0 | N₂ | 5.0 | −40 | 30 | 30 |
| 8 | 0 | N₂ | 5.0 | −40 | 30 | 30 |
| 9 | 0 | N₂ | 5.0 | −40 | 30 | 30 |
| 10 | 0 | N₂ | 5.0 | −40 | 30 | 25 |
| 11 | 0 | N₂ | 5.0 | −40 | 30 | 25 |
| 12 | 0 | N₂ | 5.0 | −40 | 30 | 25 |
| 13 | 0 | N₂ | 5.0 | −40 | 30 | 25 |
| 14 | −40 | N₂ | 5.0 | −40 | 30 | 30 |
| 15 | −20 | N₂ | 5.0 | −40 | 30 | 30 |
| 16 | 0 | N₂ | 40.0 | −40 | 30 | 30 |
| 17 | 0 | N₂ | 20.0 | −40 | 30 | 30 |
| 18 | — | Air | 5.0 | −40 | 30 | 40 |
| 19 | 0 | N₂ | 10.0 | −40 | 30 | 15 |
| 20 | 0 | N₂ | 10.0 | −40 | 30 | 15 |
| 21 | 0 | N₂ | 10.0 | −40 | 30 | 30 |
| 22 | 0 | He | 10.0 | −40 | 30 | 45 |
| 23 | 0 | He | 10.0 | −40 | 10 | 45 |
| 24 | 0 | N₂ | 5.0 | −40 | 30 | 250 |
| 25 | 0 | He | 10.0 | 0 | 30 | 45 |
| 26 | 0 | N₂ | 5.0 | −40 | 30 | 250 |
| 27 | −10 | N₂ | 10.0 | −40 | 30 | 30 |
| 28 | 0 | N₂ | 5.0 | −40 | 30 | 45 |
| 29 | 0 | N₂ | 5.0 | −40 | 30 | 30 |
| 30 | 0 | N₂ | 5.0 | −40 | 30 | 50 |
| 31 | 0 | N₂ | 5.0 | −40 | 30 | 30 |
| 32 | 0 | N₂ | 5.0 | −40 | 30 | 30 |

TABLE 2

| No. | $I_{Mg}/I_{MgOX}$ | $I_{Al}/I_{AlOX}$ | Thickness (nm) | Lubricity | Chemical Convertibility |
|---|---|---|---|---|---|
| 1 | 1.51 | 0.90 | 10.0 | B | AA |
| 2 | 1.19 | 1.54 | 10.0 | A | AA |
| 3 | 1.10 | 1.16 | 6.0 | A | AA |
| 4 | 0.82 | 1.36 | 7.0 | A | AA |
| 5 | 0.80 | 1.58 | 10.0 | AA | AA |
| 6 | 0.79 | 1.50 | 10.0 | AA | AA |
| 7 | 0.66 | 1.30 | 10.0 | AA | AA |
| 8 | 0.69 | 1.40 | 10.0 | AA | AA |
| 9 | — | 0.49 | 10.0 | B | A |
| 10 | 0.10 | 1.10 | 10.0 | AA | AA |
| 11 | 0.10 | 1.20 | 10.0 | AA | AA |
| 12 | 0.14 | 1.10 | 10.0 | AA | AA |
| 13 | 0.10 | 1.10 | 10.0 | AA | AA |
| 14 | 1.59 | 0.87 | 10.0 | B | AA |
| 15 | 1.31 | 0.61 | 10.0 | B | A |
| 16 | 1.45 | 0.62 | 30.0 | B | A |
| 17 | 1.28 | 0.90 | 30.0 | B | AA |
| 18 | 1.30 | 0.65 | 13.0 | B | A |
| 19 | 0.10 | 1.04 | 10.0 | AA | AA |
| 20 | 0.11 | 1.02 | 10.0 | AA | AA |
| 21 | 0.10 | 0.91 | 13.0 | AA | AA |
| 22 | 0.14 | 0.95 | 13.0 | AA | AA |
| 23 | 1.25 | 0.95 | 22.0 | B | AA |
| 24 | 0.59 | 0.93 | 10.0 | AA | AA |
| 25 | 1.31 | 0.94 | 21.0 | B | AA |
| 26 | 0.59 | 0.93 | 10.0 | AA | AA |
| 27 | 0.10 | 0.69 | 10.0 | AA | A |
| 28 | 0.11 | 0.83 | 20.0 | AA | AA |
| 29 | 0.12 | 0.82 | 30.0 | AA | AA |
| 30 | 0.10 | 0.60 | 16.0 | AA | A |
| 31 | 1.27 | 0.82 | 10.0 | B | AA |
| 32 | 1.50 | 0.58 | 10.0 | B | A |

[Lubricity]

In addition, a ball-on-disk test was performed on the obtained plated steel sheet in the following manner to evaluate the lubricity. In this test, a SUS sphere of 5 mmφ was pressed against a sample with a load P of 30 N. The sample was rotated at a rotation speed of 1 rpm with a radius of rotation of 10 mm while the load P was applied, and a load F in a direction perpendicular to the SUS sphere was measured. A dynamic friction coefficient was obtained by dividing F at a time when the sliding distance was 200 mm by P. The evaluation was performed as follows depending on the dynamic friction coefficient. In a case where the level was AA or A, it was determined that the lubricity was excellent.

AA: The dynamic friction coefficient is 0.2 or less.
A: The dynamic friction coefficient is greater than 0.2 and not greater than 0.4.
B: The dynamic friction coefficient is greater than 0.4.

[Chemical Convertibility]

In addition, the chemical convertibility of the obtained plated steel sheet was evaluated in the following manner.

A sample of 50×100 mm (×sheet thickness) was collected from the obtained plated steel sheet, and a zinc phosphate treatment was performed on the sample according to (SD5350 system: Standard of Nippon Paint Industrial Coatings Co., LTD.) to form a chemical conversion film. The proportion (area %) of lack of hiding of the chemical conversion film was measured by observing the surface of the plated steel sheet on which the chemical conversion film was formed by SEM. In this case, the area ratio of a region where the steel sheet was exposed in an SEM observation field of view was defined as the proportion of lack of hiding. The chemical convertibility was evaluated as follows from the proportion of lack of hiding.

AA: No lack of hiding
A: lack of hiding is 5% or less

As can be seen from Tables 1A, 1B, and 2, Invention Example Nos. 2 to 8, 10 to 13, 19 to 22, 24, and 26 to 30 obtain excellent lubricity. In addition, among these. Nos. 3 to 8, 10 to 13, 19 to 22, 24, 26, 28, and 29 in which $Al/Al_{Ox}$ was high were also excellent in chemical convertibility.

In contrast, in Comparative Example Nos. 1, 9, 14 to 18, 23, 25, 31, and 32, at least one of the chemical composition of the plating layer or the conditions for cooling from bath temperature to 380° C. or from 380° C. to 100° C. deviated from a preferable range, and thus $I_{Mg}/I_{MgOx}$ of the oxide layer increased and the lubricity was reduced.

INDUSTRIAL APPLICABILITY

According to the present invention, it is possible to provide a plated steel sheet having excellent lubricity, which is a Zn—Al—Mg-based plated steel sheet. The steel sheet has improved press formability, and thus can be suitably applied to an automobile structural member.

What is claimed is:

1. A plated steel sheet for automobile structural members comprising:
   a steel sheet;
   a plating layer formed on at least a part of a surface of the steel sheet; and
   an oxide layer formed on at least a part of a surface of the plating layer,
   wherein the plating layer contains, as a chemical composition, by mass %,
   Al: 0.5% to 35.0%,
   Mg: 0.5% to 15.0%,
   Si: 0% to 2.0%,
   Ca: 0% to 2.0%,
   Fe: 0% to 2.0%,
   La+Ce: 0% to 0.5% in total,
   Sb: 0% to 0.5%,
   Pb: 0% to 0.5%,
   Sr: 0% to 0.5%,
   Sn: 0% to 1.0%,
   Cu: 0% to 1.0%,
   Ti: 0% to 1.0%,
   Ni: 0% to 1.0%,
   Mn: 0% to 1.0%,
   Cr: 0% to 1.0%,
   Nb: 0% to 1.0%,
   Zr: 0% to 1.0%,
   Mo: 0% to 1.0%,
   Li: 0% to 1.0%,
   Ag: 0% to 1.0%,
   B: 0% to 0.5%,
   Y: 0% to 0.5%,
   P: 0% to 0.5%, and
   a remainder of Zn and impurities, and
   when measurement by XPS is performed at a position 5.0 nm below a surface of the oxide layer in a thickness direction, $I_{Mg}/I_{MgOx}$, which is a ratio of a maximum detected intensity of Mg to a maximum detected intensity of an oxide or hydroxide of Mg, is 0.00 or greater and 1.20 or less.

2. The plated steel sheet for automobile structural members according to claim 1,
   wherein the chemical composition of the plating layer contains, by mass %,
   Al: 6.0% to 30.0%, and
   Mg: 3.0% to 11.0%.

3. The plated steel sheet for automobile structural members according to claim 2,
  wherein when measurement by XPS is performed at a position 5.0 nm below the surface of the oxide layer in the thickness direction, $I_{Al}/I_{AlOx}$, which is a ratio of a maximum detected intensity of Al to a maximum detected intensity of an oxide or hydroxide of Al, is 0.77 or greater.

4. The plated steel sheet for automobile structural members according to claim 3,
  wherein the $I_{Mg}/I_{MgOx}$ is 0.00 or greater and 0.80 or less.

5. The plated steel sheet for automobile structural members according to claim 2,
  wherein the $I_{Mg}/I_{MgOx}$ is 0.00 or greater and 0.80 or less.

6. The plated steel sheet for automobile structural members according to claim 1,
  wherein when measurement by XPS is performed at a position 5.0 nm below the surface of the oxide layer in the thickness direction, $I_{Al}/I_{AlOx}$, which is a ratio of a maximum detected intensity of Al to a maximum detected intensity of an oxide or hydroxide of Al, is 0.77 or greater.

7. The plated steel sheet for automobile structural members according to claim 6,
  wherein the $I_{Mg}/I_{MgOx}$ is 0.00 or greater and 0.80 or less.

8. The plated steel sheet for automobile structural members according to claim 1,
  wherein the $I_{Mg}/I_{MgOx}$ is 0.00 or greater and 0.80 or less.

* * * * *